United States Patent [19]

Ruhnau et al.

[11] 4,270,810
[45] Jun. 2, 1981

[54] CIRCUIT FOR INFLUENCING THE BRAKE-PRESSURE RELEASE AND/OR BRAKE-PRESSURE HOLDING PHASES FOR ANTILOCKING VEHICLE BRAKE SYSTEMS

[75] Inventors: Gerhard Ruhnau; Wolfgang Gudat; Klaus Lindemann; Manfred Saba, all of Hanover, Fed. Rep. of Germany

[73] Assignee: WABCO Fahrzeugbremsen GmbH, Hanover, Fed. Rep. of Germany

[21] Appl. No.: 32,571

[22] Filed: Apr. 23, 1979

[30] Foreign Application Priority Data

Apr. 29, 1978 [DE] Fed. Rep. of Germany ....... 2819102

[51] Int. Cl.³ ................................................ B60T 8/02
[52] U.S. Cl. ..................................... 303/106; 303/110
[58] Field of Search ................. 303/106, 105, 110, 91, 303/20

[56] References Cited

U.S. PATENT DOCUMENTS

| 3,833,270 | 9/1974 | Gotz et al. | 303/106 |
| 3,863,993 | 2/1975 | Fleischer et al. | 303/106 |
| 4,054,328 | 10/1977 | Leiber et al. | 303/106 X |
| 4,054,329 | 10/1977 | Müller et al. | 303/106 |
| 4,077,675 | 3/1978 | Leiber et al. | 303/110 X |

Primary Examiner—J. D. Miller
Assistant Examiner—Reinhard J. Eisenzopf
Attorney, Agent, or Firm—J. B. Sotak

[57] ABSTRACT

A circuit arrangement for influencing the brake pressure venting phase and/or brake pressure retaining phase for an antiskid vehicle braking system when the measured velocity difference deviates from a given velocity difference during controlled braking. The velocity change is determined as a function of the wheel tendency or tendencies by measuring and differentiating the velocity value or values at the interval boundaries of an assigned time Δt of the control signals or by the assigned times of the control signals. A switching circuit, to which the brake pressure control signals, such as, the acceleration +b, deceleration −b and slip λ control signals, and a signal representing the wheel tendencies, such as, either positive or negative velocity change of the sensed wheel or wheels, can be set upon drop away of a +b or −b signal. The switching circuit controls a shifting circuit which changes the assigned time Δt or some or all assigned times Δt or changes the switching times of the control signals as a function of the signal or signals indicating the wheel tendency or tendencies. Thus, the shifting circuit produces a high signal, a medium signal, or a low signal indication representing an appropriate assigned time Δt.

15 Claims, 6 Drawing Figures

CIRCUIT FOR INFLUENCING THE BRAKE-PRESSURE RELEASE AND/OR BRAKE-PRESSURE HOLDING PHASES FOR ANTILOCKING VEHICLE BRAKE SYSTEMS

FIELD OF THE INVENTION

The invention relates to a switching arrangement for controlling the brake pressure venting phase and/or brake pressure retaining phase for antiskid type of vehicle brakes when the measured velocity difference deviates from a given velocity difference during controlled braking.

BACKGROUND OF THE INVENTION

During the differentiating of velocity values v present in digital form or of values corresponding to them, a minimum permissible differential velocity $\Delta v$ versus the value at the beginning of the assigned time $\Delta t$ must be exceeded to generate deceleration $-b$ and acceleration $+b$ control signals, during an assigned time $\Delta t$.

When the starting mode of the vehicle wheel exhibits a wrong tendency upon removal of the b signals, this is an indication that the chosen assigned time was too long. If, for example, two like $-b$ signals appear before an unlike $+b$ signal, it appears this would indicate that the chosen assigned time was too short. Further, if the $+b$ signal reappears before a $-b$ signal appears, this is an indication that the switching time of the $+b$ signal was too short or the air release phase was too short. In each of these situations, there is a risk that the reference velocity or wheel velocity deviates too much from the vehicle velocity and proper control of the brake pressure is no longer possible. The manner of deriving and forming the reference velocity is shown and described in U.S. Pat. No. 4,113,322 which is assigned to the assignee of the present application.

A known method for generating digital acceleration and deceleration signals is shown and described in German Pat. No. 2,342,358, in which an assigned time or measuring period of a given duration is provided and in which corresponding signals are generated when given difference values are exceeded. The patented process is based on the selection of relatively long assigned times and large difference values for filtering purposes so that disturbing signals cannot simulate the generation of deceleration control and acceleration control signals for a short time. In order to improve the dropout behavior, a change in length of the assigned time and a shift of the difference value to a smaller predetermined value it provided when the acceleration or deceleration control signals appear within the assigned time. At the end of each expired assigned time, the measurement of the preceding velocity is stored and compared with the next value measured. As soon as a larger difference value is determined, the current assigned time is interrupted and restarted. The arrangement provided to carry out the process included a time delay element having a time constant corresponding to the duration of the period and which was shifted by a switching signal, namely a $-b$ control signal. The control signal was generated by a comparator circuit when the measured value exhibits a predetermined deviation from the reference value which was stored in the memory bank. In order to prevent the switching signals from terminating too early, a relatively long time is provided for the measuring period to compensate for external disturbances. These disturbances in the wheel behavior can be caused by dynamic axle shifting as well as by unfavorable road conditions. In the previous operations, the most unfavorable was anticipated which means that a delayed decrease is employed even if the unfavorable condition programmed into the system does not occur.

OBJECTS AND SUMMARY OF THE INVENTION

Therefore, it is an object of the present invention to devise an improved circuit arrangement wherein the wheel velocity can be matched more simply and reliably to the vehicle velocity so that the danger of improper control is avoided.

Another object of this invention is to provide an improved switching circuit arrangement for controlling the brake pressure exhausting phase and brake pressure holding phase for antiskid vehicle braking apparatus when the measured velocity change differs from a given velocity change during controlled braking wherein the velocity change is obtained by measuring and forming different velocity values at the intervening limits of an assigned time $\Delta t$, characterized by, switching means having a plurality of inputs for accommodating acceleration, deceleration and slip control signals as well as a signal representing the tendency of a monitored wheel of the vehicle and shifting means responsive to the switching means for establishing the assigned time $\Delta t$ dependent upon the particulars of the acceleration, deceleration and slip control signals and as a function of the wheel tendency signal.

A further object of this invention is to provide a unique antiskid switching circuit arrangement for controlling braking of vehicles which is efficient in operation, reliable in use, economical in cost, effective in service and simple in design.

According to the present invention, the change in the assigned time $\Delta t$ or the switching times of the control signals effectively occurs as a function of the starting tendency of the wheel when the b signals drop away and as a function of whether two consecutive deceleration signals occur without an acceleration signal or two acceleration signals occur without a deceleration signal. Thus, determination of unfavorable roadway conditions in a fixed predetermined manner is no longer necessary. In the present invention, disturbance signals can be identified and the risk of premature drop away of the switching signals and the concomitant disadvantageous pressure drop can be prevented. When like control signals occur during a control sequence, the selected time assignment is too short. In the case of two consecutive $-b$ control signals, the assigned time $\Delta t$ is too long. The tendency of the wheel can be determined, for example, by comparing successive velocity values, by comparing values corresponding to these velocity values or by comparing the initial value for the assigned time with the instantaneous values.

The following examples are given by way of illustration: If the $-b$ signal drops away and the wheel exhibits a positive tendency, namely, the detected velocity at the end of the assigned time $\Delta t$ is greater than velocity at the beginning of the assigned time $\Delta t$, then the time assignment $\Delta t$ for the next $-b$ signal is shortened. However, if the $-b$ signal drops away and the tendency of the wheel is negative, then the time assignment remains unchanged. If a second $-b$ signal appears without prior appearance of a $+b$ signal, the time assignment $\Delta t$ for the second $-b$ signal is lengthened.

Advantageous further developments of the invention are characterized in the claims.

DESCRIPTION OF THE DRAWINGS

The foregoing objects, advantages and other attendant features will be more readily apparent and appreciated as the subject invention becomes more clearly understood by reference to the following detailed description when considered in conjunction with the accompanying drawings wherein.

DETAILED DESCRIPTION OF THE INVENTION

Figure 1:
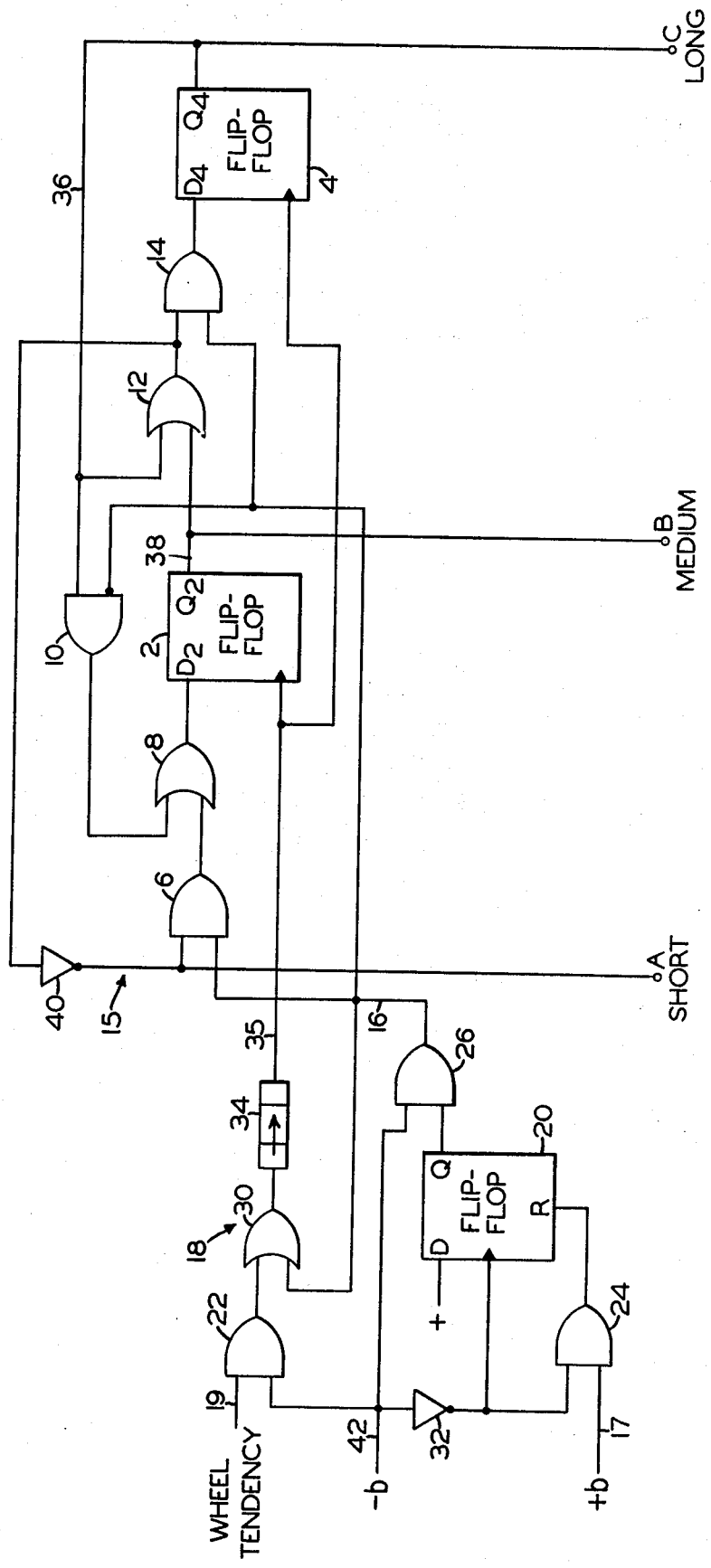
FIG. 1 is a schematic illustration of a circuit diagram in accordance with the invention for changing the assigned time as a function of the appearance of the acceleration and deceleration signals as well as the starting tendency of the vehicle wheel.

Referring now to the drawings and in particular to FIG. 1, there is shown a switching arrangement which includes a pair of data flip-flops 2 and 4, forming a shift register 15. The shift register is capable of being shifted in a left-hand or a right-hand direction and is provided with suitable logical connections through gates 6, 8, 10, 12 and 14. The direction of displacement or shifting is dependent upon the signal condition on a line 16.

The shift register 15 is started by a switching circuit portion 18 which functions in response to the drop-away condition of the deceleration control signals, namely, the trailing edge of the $-b$ signals. The switching element 18 connects the $-b$ control signals which are supplied to line 42 while the acceleration control signals, $+b$ control signals, are fed via a line 17. The signals indicating the drop-away condition in the case of a preceding $-b$ control signal (positive tendency→positive signal, negative tendency→negative signal), and the latter, the tendency-indicating signals are stored until the next $-b$ control signal drops out. In each case, the signals are sent through a line 19. The switching portion 18 includes a data flip-flop 20, three AND gates 22, 24 and 26, and OR gate 30, an inverter 32 and a timing circuit 34 with built in delayed switching actions, as shown. The data input D of the flip-flop 20 is connected to a source of positive potential.

The delayed output from the timing element 34 is connected over lead 35 to the dynamic clock pulse inputs of the data flip-flops 2 and 4. The AND gate 26 has its output lead 16 connected to the data input $D_2$ of the flip-flop 2 via the AND gate 6 and the OR gate 8. The output lead 16 is also connected to the data input $D_4$ of the flip-flop 4 via the AND gate 14. The purpose of the time delay in starting is employed to prevent the signals at the data inputs of the flip-flops 2 and 4 from changing simultaneously with the pulses applied to the clock inputs.

The output developed on $Q_4$ of the second data flip-flop 4 is fed back to the data input $D_2$ of the flip-flop 2 over output lead 36, through AND gate 10 or OR gate 8. The output $Q_4$ of flip-flop 4 is also connected to its own data input $D_4$ via OR gate 12 and AND gate 14. The output developed on $Q_2$ of the first data flip-flop 2 is fed back to the input $D_2$ of flip-flop 2 via an output line 38, the OR gate 12, an inverter 40, the AND gate 6 and OR gate 8. In so doing, the shift register 15 is prevented or unable to inadvertently shift in both directions at the same time. As shown, the shift register 15 has three outputs A, B and C for short, medium and long assigned times $\Delta t$.

Turning now to the operation of the circuit arrangement shown in FIG. 1, it will be initially assumed that a negative tendency is exhibited, namely, that a low signal level is on line 19, and a drop-away condition of the $-b$ control signal has occurred so that a low signal level appears on line 42. Under this condition, the data flip-flop 20 is set so that a high signal level appears at its output terminal Q. Since the coincidental input condition is not met for the AND gate 26, a low level signal is present in line 16. Thus, the timing element 34 is not activated, so that the output of the timing element 34 is at a low state. Hence, no clock pulses are applied to flip-flops 2 and 4 and their conditions remain unchanged so that the preset assigned time stays the same.

Now, let us assume there is a high signal condition or state exists at output terminal $Q_2$ of flip-flop 2. Further, that the wheel has a positive tendency so that a high signal appears on line 19 and that the $-b$ control signal drops away so that a low level signal is developed on line 42. Under this condition, the data flip-flop 20 is first set, so that a high level signal appears on output Q. Since the coincidental condition is not met at the input of AND gate 26 due to the low level of a $-b$ control signal on lead 42, a low level signal appears on line 16. Further, the time delay element 34 is inactive so that no clock pulses appear on line 35. Now, if a $+b$ control signal appears on lead 17, the flip-flop 20 will be reset so that a low level signal is produced on the output Q. Now, when the next $-b$ control signal appears on lead 42 and with a high signal still appearing on line 19, the positive wheel tendency of the AND gate 22 produces an output which is conveyed through an OR gate so that the time delay element 34 is activated. It will be appreciated that the lead 16 remains in a low signal condition because the output Q of flip-flop 20 is at a low level condition. After a predetermined period of time, the time delay element 34 delivers clock pulses to the flip-flops 2 and 4 of the shift register 15. Since a low level signal is present at the data input $D_2$ of flip-flop 2, the output $Q_2$ of flip-flop 2 is at a low level, consequently, the medium output terminal B is at a low value. Thus, the output $Q_4$ of flip-flop 4 remains low. The low level signals on lines 36 and 38 from outputs $Q_2$ and $Q_4$ of flip-flops 2 and 4 pass through OR gate 12 to the inverter 40. The inverter 40 inverts the low level signal and causes a high level signal to be developed on the output terminal A which results in the shortening of assigned time.

Let us again assume that a high level signal condition exists on the data output $Q_2$ of flip-flip 2 and, in turn, the medium output terminal B. Now, when the $-b$ control signal falls or drops, the flip-flop 20 is again set, and thus a high level signal appears on its output Q. Further, a low level signal appears on lead 16 because the two inputs of the AND gate 26 are not in a high condition. It will be appreciated that since the coincidental condition on AND gate 22 is also not fulfilled, a low signal condition is also present on lead 35. Now, when the next $-b$ control signal appears in the absence of a preceding $+b$ control signal, the two high inputs are present on the AND gate 26 so that a high signal condition appears on lead 16. Thus, the time delay element 34 which is started by the OR gate 30 begins to run through its timing sequence. After the predetermined time elapses, the time delay element produces a clock pulse on lead 35. The high signal condition on lead 16 causes the two inputs to be on the AND gate 14 so that a high signal condition appears on the data input $D_4$ of flip-flop 4. However, the AND gate 10 is blocked by the high signal condition on lead 16 because the lead 16 is connected to the negated input of this AND gate. The high signal condition on line 38 blocks AND gate 6 because of the inversion of inverter 40 so that the potential at data input $D_2$ of flip-flop 2 is at a low state. After the delay time has elapsed, the flip-flops 2 and 4 are triggered by the clock pulse so that output $Q_2$ goes to low signal level and output Q goes to a high signal level thereby causing an increase in the assigned time by one step. Thus, a high signal condition appears on the long output terminal C.

Now, if the −b signal now decreases, the signal levels on leads 16 and 35 return to low states so that the AND gate 10 becomes unblocked. Thus, a high signal condition appears at the data input $D_2$ of flip-flop 2 because of the high or positive signal state on output $Q_4$ of flip-flop 4. The data input $D_4$ of flip-flop 4 goes to low signal condition. The high signal condition on lead 36 becomes a low signal condition as a result of inverter 40 so that a low signal condition appears at short output terminal A.

Even if a +b control signal reappears, there can be an increase in the assigned time for the −b control signal since when the wheels begin to accelerate beyond a critical point, it may be assumed that the braking pressure had not dropped far enough.

As previously mentioned, the shift register 15 is protected against being inadvertently shifted to the left and right. This will be explained in the following manner. Let us assume that a high or positive signal condition is developed on output terminal A which signifies a short assigned time and that a positive tendency wherein a high signal condition appears on line 19. Now, in the case of a drop away of a −b signal, a shortening of the assigned time would ordinarily be caused by the circuit of FIG. 1 if a high condition appeared on either output terminal B or C while the other outputs are in low conditions. However, if it is assumed that the shortest time assignment stage (A) is switched on, then the flip-flop 20 is first reset by the drop away of the −b control signal. As a result, a low signal condition is present on lines 16 and 35. If a +b control signal follows, the flip-flop 20 stays reset and the signal state on lines 16 and 35 remains in a low condition. Now, when the next −b control signal appears on line 42, the two inputs are present at the AND gate 22 so that its output initiates the timing circuit 34. The low signal condition on line 16 results in the blocking of the AND gates 6 and 14 and causes unblocking or release of the AND gate 10. Hence, low level signals appear at data inputs $D_4$ and $D_2$. After the elapse of the predetermined time delay period, timing element 34 produces clock pulses on line 35 so that the signal conditions appearing on the data inputs of flip-flops 2 and 4 cause their outputs $Q_2$ and $Q_4$ to retain or assume the low signal state. However, due to the inversion of the low output signal of flip-flop 4 by inverter 40, the output terminal A remains high for the predetermined short assigned time period. Thus, the inadvertent shifting of the shift register 15 to the left is prevented by the above-noted operation.

Now, it will be explained how the shift register 15 is prevented from accidentally shifting to the right. Let us assume that the output terminal C for the long assignment time is at a high signal condition and that the −b control signal has dropped away. The running tendency of the vehicle wheel and the signal state on line 19 can be either positive or negative. When the −b signal drops away, the flip-flop 20 is set so that a high signal condition appears at its output Q. If the next −b control signal now appears without being preceded by a +b control signal, the two inputs will be present on the AND gate 26 as long as the −b control signal is present. As a result, a high signal condition appears on line 16 causing the activation of time delay element 34. The high signal on line 16 causes a low signal to appear at the data input $D_2$ of flip-flop 2 because the AND gates 6 and 10 are in a blocking state. The high signal condition on lead 16 also causes a high signal to appear at data input $D_4$ of of flip-flop 4 and the AND input condition of the AND gate 14 is satisfied since the high signal on lead 16 appears on one input of AND gate 14 and the high signal of the output of flip-flop 4 passes through OR gate 12 to the other input of the AND gate 14. After expiration of the predetermined time delay period, the two flip-flops 2 and 4 are clocked so that the output $Q_4$ of flip-flop 4 and the output terminal C become or remain in a high signal state while the other two output terminals A and B remain in a low signal state. As a result, the shift register 15 is prevented from inadvertently shifting to the right.

However, it is possible for the wheel velocity to drop below the vehicle velocity and thereafter being incapable of reaching the vehicle velocity again. Under this condition, if the reference velocity is not moved or pulled far enough upward again, there is a hazard of generating erroneous control signals. In order to prevent such adverse and possible dangerous situation, it is highly advantageous to employ the unique circuits of FIGS. 2 to 6.

In addition to needing the deceleration control and acceleration control signals, −b and +b signals, there is a requirement to produce the slip control signals λ in antiskid vehicle brake systems. The slip control signals and the deceleration control −b signals result in the air being released, but the brake pressure is retained when acceleration control +b signals appear.

Now, if the acceleration control +b signal drops away but the slip control signal remains, it can be assumed that the axle load has changed but that the iversion process of stopping the wheels has started prematurely. Further, if another acceleration control +b signal comes before a deceleration control −b signal has appeared because the air discharge phase has been initiated, the slip control signal can then be given priority over the second acceleration control +b signal which is temporarily limited in order to obtain proper restarting of the wheel.

Figure 2:
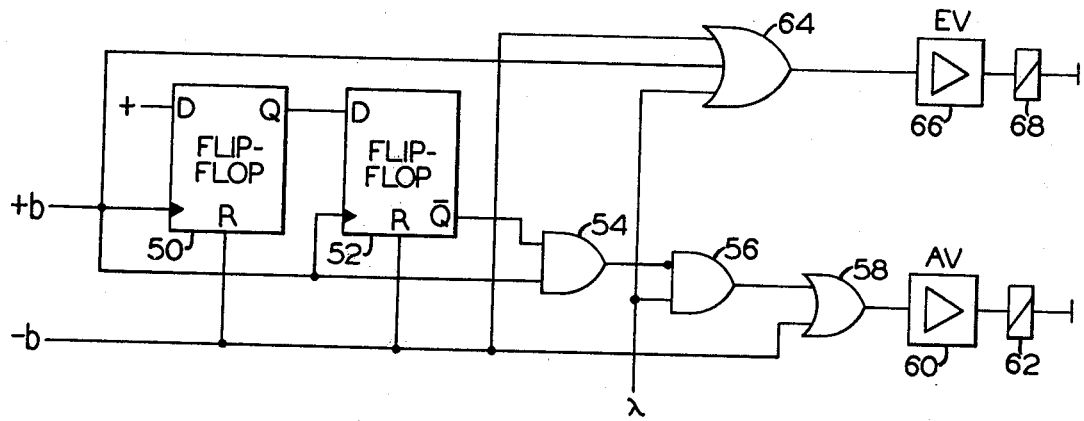
FIGS. 2-6 are schematic illustrations of circuits for preventing additional deviation of the reference velocity or wheel velocity from the vehicle velocity.

The unique circuit for carrying out such an operation is shown in FIG. 2. It will be appreciated that the repeated appearance of the +b control signals without the appearance of −b control signals can easily occur in the case where the contact surface has a low (coefficient of friction) value.

As shown, the circuit arrangement of FIG. 2 includes two data flip-flops 50 and 52 which are set by the presence of the +b signals and which are reset by the appearance of the −b signals. The output Q of flip-flop 50 is connected to data input D of flip-flop 52 having a negated output Q. The negated output signal of the flip-flop 52 and the +b signal are connected to the two inputs of AND gate 54. The output of AND gate 54 is connected to the negative input of an AND gate 56 while the slip control signal λ is connected to the other input of the AND gate 56. The output of the AND gate 56 is combined with a lead from the deceleration control −b signal in an OR gate 58. The output from OR gate 58 is connected to an output amplifier 60 which controls an exhaust valve 62.

The +b, −b and λ control signals are also connected to the respective inputs of a three-input OR gate 64. The output of OR gate 64 is fed to an output amplifier 66 which energizes an intake valve 68.

Turning now to operation of the circuit of FIG. 2, it will be seen that the appearance of a −b control signal resets both data flip-flops 50 and 52 and actuates the intake valve and exhaust valve to depressurize the brake cylinders. The λ control signal which maintains the exhaust valve 62 energized can be rendered ineffective by the appearance of the +b signal which blocks the AND gate 56. As long as no +b control signal appears, the flip-flops 50 and 52 remain reset so that the output $\overline{Q}$ of flip-flop 52 stays in a high condition.

Now, if a +b control signal appears, the λ control signal can normally be blocked. However, if a +b signal appears repeatedly without being preceded by a −b signal, a blocking condition can be eliminated in order to obtain a longer depressurizing time for proper readjustment of the reference velocity. This is accomplished by the circuit of FIG. 2. It has been found that the −b and λ control signals almost invariably occur simultaneously. If the +b control signal appears, the output $\overline{Q}$ of flip-flop 52 reverts to a low signal state after the time elapses for transfer of the potential from the data input of flip-flop 50 to the output of flip-flop 52 so that the AND gate 54 will become blocked. Thus, the λ control signal can cause the energization of exhaust valve 62 via AND gate 56, OR gate 58 and power amplifier 60. Until this time, the λ signal is blocked from energizing the exhaust valve 62. The transfer lasts until a −b control signal reappears normally. If the +b control signal now drops out, the AND gate 54 becomes blocked, but the AND gate 56 is again unblocked for passing the λ signal through OR gate 58 and amplifier for energizing the exhaust valve 62. If a +b control signal now reappears without being preceded by a −b control signal, the flip-flop 50 is now reset and the low signal state at output $\overline{Q}$ of flip-flop 52 remains intact. Thus, the AND gate 54 is not released, but the AND gate 56 admits or passes the λ control signal to energize the exhaust valve 62. In this way, the air exhausting phase of the anti-skid control operation is prolonged thereby providing easier readjustment of the reference velocity to the vehicle velocity.

Now if the +b control signal drops away but the λ control signal is not present, the brake pressure is immediately applied and the reference velocity is rapidly pulled down. In order to prevent such operation and to adjust the reference velocity or wheel velocity approximately to the vehicle velocity, it is highly advantageous to employ the unique circuit of FIG. 3. This circuit has essentially a timing element 70 with delayed cut-off. The +b control signal is applied to the input of time delay element 70. The output signal of time element 70 as well as the +b control signal are connected to the respective inputs of the two-input AND gate 72. It will be seen that the input is negated for the +b control signal. The output of the AND gate 72 leads to a threshold state (not shown) with a small λ threshold and switches on the small λ threshold for the duration of the cut-off delay so that a depressurizing process can occur even after the +b control signal drops out.

Figure 3:
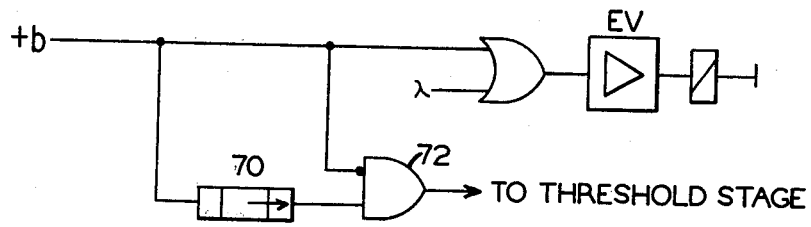

Thus, the circuit of FIG. 3 causes a reduced λ threshold to be switched on for a predetermined time after the +b control signal drops out so as to adjust the wheel velocity more easily and rapidly to the vehicle velocity.

Figure 4:
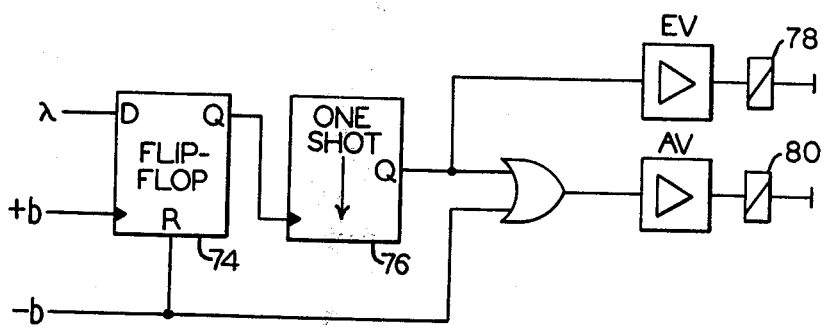

Another unique circuit for preventing the wheel velocity from dropping below the vehicle velocity and for preventing it from failing to adjust to the vehicle velocity is shown in FIG. 4.

The circuit shown in FIG. 4 includes a data flip-flop 74. The data input of flip-flop 74 is coupled to the λ control signals while the clock input is connected to the +b control signals. The reset input R is coupled to the −b control signals. The output Q of flip-flop 74 is connected with the timing input of a monostable multivibrator 76. The output signals derived from the one-shot 76 are used to energize intake valves 78 and exhaust valves 80. The data flip-flop 74 is triggered by a signal pulse when the +b control signal drops away so that the one-shot 76 is activated by a high impulse signal.

Normally, when the +b control signal drops away, the λ control signal also drops away since the reference velocity is raised along with it. However, if the reference velocity is not raised along with it so that the λ control signal remains or is still present, the depressurizing should continue for a certain length of time to guarantee the raising of the reference velocity.

Thus, if the +b control signal drops away and λ control signal remains, the input D of flip-flop 74, the one-shot 76 is switched to the high output signal state for a certain length of time, namely, the relaxation time. Thus, the high signal at the output Q of flip-flop 74 causes the one-shot 76 to energize both the intake valve and exhaust valve for the purpose of depressurization for a certain duration of this time which is unaffected by the appearance of additional +b control signals. The data flip-flop 74 therefore interrogates whether a λ control signal is still present when the +b control signal drops away. Thus, the circuit of FIG. 4 causes the depressurization to last a longer period of time than the circuit of FIG. 3.

Figure 5:
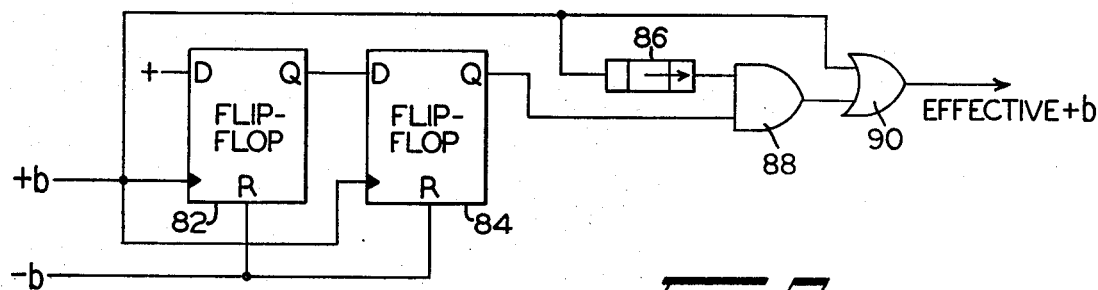

Let us now refer to FIG. 5 wherein there is shown a circuit which is similar to the circuit of FIG. 2. The circuit operates to detect the repeated appearances of +b control signals which are not preceded by a −b control signal. As shown, the circuit includes two data flip-flops 82 and 84. The flip-flops 82 and 84 are clocked by the +b control signal and are reset by the −b control signal. A source of high positive potential is applied to the data input D of flip-flop 82, and the data input D of flip-flop 84 is connected with output Q of flip-flop 82. The +b control signal also activates a timing element 86 which has a delayed cut-off. The output signal of the time delay element 86 and the output signal Q of flip-flop 84 are connected to the respective inputs of a two-input AND gate 88. The output signal of AND gate 88 along with the +b control signal are connected to the two-input OR gate 90. Now, when a +b control signal appears, the flip-flop 82 and flip-flop 84 are set so that a high level signal appears at the output Q of flip-flop 84 after the potential transfer time elapses. This high level signal remains intact until the next −b control signal appears. If another +b control signal appears before the appearance of a preceding −b signal, a high level signal is still conveyed by the OR gate 90 after drop-away of the +b control signal even after the instant of drop away of this +b control signal because of the time delay cut-off feature of element 86 via AND gate 88.

Figure 6:
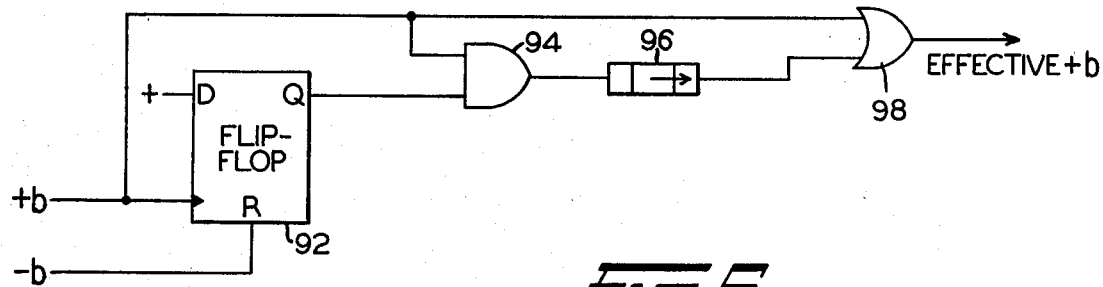

An increase in the effect of +b control signal time may be achieved by the unique circuit shown in FIG. 6. The circuit includes a data flip-flop 92 having a dynamic clock input, a reset input R and a data input D. The +b control signal is applied to the clock input while the −b control signal is connected to the reset input R. The data input D is supplied with a high or positive potential. The data flip-flop 92 is clocked by the drop-away of the +b control signal. The output signal on terminal Q of flip-flop 92 and the +b control signal are connected to the respective inputs of the two-input AND gate 94. Output signal of the AND gate 94 starts a timing element 96 which delays signal cut-off a desired period of time. The output signal of time delay element 96 and the +b control signal are connected to the two inputs of an OR gate 98. As soon as the +b control signal drops away, the two inputs are no longer present on the AND gate 94, but the time delay period of the timing element 96 begins to run thereby effectively lengthening the +b control signal. Hence, a lengthening of the pressure retention phase is achieved for the duration of the cut-off period. A repeated appearance of the +b control signal without a preceding +b control signal operates in this circuit in the same way as that in the circuit of FIG. 1, namely, with the aid of a flip-flop and an AND gate.

It will be appreciated that the details of the invention, which have been disclosed and described in the drawings and foregoing description, are to be considered as illustrative and not restrictive in nature. Accordingly, it is understood that various alterations may be made by persons skilled in the art without departing from the spirit and scope of this invention. Thus, it is apparent that numerous modifications and changes can be made to the presently described invention, and therefore, it is understood that all changes, equivalents and modifications producing the same results with substantially the features in substantially the manner as this invention are herein meant to be included in the appended claims.

Having now described the invention, what we claim as new and desire to secure by Letters Patent, is:

1. A switching circuit arrangement for controlling the brake pressure exhausting phase and brake pressure holding phase for antiskid vehicle braking apparatus when the measured velocity change differs from a given velocity change during controlled braking wherein the velocity change is obtained by measuring and forming different velocity values at the intervening limits of an assigned time Δt, characterized by, switching means having a plurality of inputs for accommodating acceleration and deceleration control signals as well as a signal representing the starting tendency signal of a monitored wheel of the vehicle, and bidirectional shift register means responsive to the switching means for establishing the assigned time Δt dependent upon the particulars of the acceleration and deceleration control signals and as a function of the wheel tendency signal.

2. The switching circuit arrangement according to claim 1, wherein said shift register means causes a shorter assigned time Δt when a deceleration control signal disappears and a positive tendency is exhibited by the monitored wheel.

3. A switching circuit arrangement according to claim 1, wherein said shift register means causes an increase in the assigned time Δt when another deceleration control signal occurs before the occurrence of an acceleration control signal.

4. A switching circuit arrangement according to claim 1, wherein said shift register means fails to change the assigned time Δt when a deceleration control signal ceases during the presence of a negative wheel tendency signal as well as when an acceleration control signal ceases during the presence of a positive wheel tendency signal in the event no other like deceleration or acceleration control signal has appeared without the prior appearance of an unlike acceleration or deceleration control signal.

5. A switching circuit arrangement according to claim 1, wherein said shift register means is a shift register having a plurality of stages, each of which is representative of a different assigned time Δt.

6. A switching circuit arrangement according to claim 5, wherein said shift register is capable of being shifted in both a left-hand and right-hand direction.

7. A switching circuit arrangement according to claim 5, wherein said switching means is a logic circuit which logically connects the acceleration, deceleration and slip control signals with each other and also with the signal indicating the wheel tendency, and controls the shift register in accordance with the connections.

8. A switching circuit arrangement according to claim 7, wherein said logic circuit includes a first AND gate for accommodating the deceleration control signal and the wheel tendency signal, a second AND gate for accommodating a deceleration control signal which is negated by an inverter along with the acceleration control signal, a data flip-flop having a reset input which is connected with the output of said second AND gate, having a clock input which is connected to the output of said inverter, and having a data input which is supplied with a positive potential, a third AND gate for accommodating the output of said flip-flop along with the deceleration control signal, an OR gate having its input connected with the outputs of said first and third AND gates, and a time element device connected to the output of said OR gate for providing a delayed signal.

9. A switching circuit arrangement according to claim 8, wherein said shift register includes a first data flip-flop and a second data flip-flop, OR gate connected to the output of said first flip-flop and to the output of said second flip-flop, the output of said first OR gate of said shift register and the output of said third AND gate of said logic circuit is connected to a first AND gate of said shift register, the output of said first AND gate of said shift register is connected to the data input of said second flip-flop, the output of the second flip-flop and a negated output of said first AND gate of the logic circuit is connected to a second AND gate of said shift register, the output of said first AND gate of said logic circuit and the output signal of said first OR gate which is negated by an inverter is connected to a third AND gate of said shift register, the negated output of said inverter and the output of said second AND gate is connected to a second OR gate, the output of said second OR gate is connected to the data input of first flip-flop (2), and the clock inputs of said first and second data flip-flops are connected to the output of the time element.

10. A switching circuit arrangement according to claim 9, wherein the output of said inverter of said shift register and the outputs of said first and second data flip-flops of said shift register are assigned to different assigned times.

11. A switching circuit arrangement for controlling the brake pressure exhausting phase and brake pressure holding phase for antiskid vehicle braking apparatus when the measured velocity change differs from a given velocity change during controlled braking wherein the velocity change is obtained by measuring and forming different velocity values, characterized by, switching means having a plurality of inputs for accommodating acceleration, deceleration and slip control signal for causing an increase in the switching time of the slip control signal when the acceleration control signal reappears during the presence of a slip control signal without prior appearance of a deceleration control signal, and said switching means includes a first data flip-flop and second data flip-flop, the clock inputs of said first and second flip-flops are supplied with the acceleration control signal, the reset inputs of said first and second flip-flops are supplied with the deceleration control, the data input of the first flip-flop is connectable to a positive potential, the output of the first flip-flop is connected with the data input of the second flip-flop, the output of said second flip-flop is negated, the output of said second flip-flop and the acceleration control signal are connected to a first AND gate, the output signal of said first AND gate is connected to a negated input of a second AND gate while the acceleration control signal is connected to another input of said second AND gate, the output signal of said second AND gate and the deceleration signal are coupled to an exhaust valve via a first OR gate, while acceleration, deceleration and slip control signals are coupled to an input valve via a second OR gate.

12. A switching circuit arrangement for controlling the brake pressure exhausting phase and brake pressure holding phase for antiskid vehicle braking apparatus when the measured velocity change differs from a given velocity change during controlled braking wherein the velocity change is obtained by measuring and forming different velocity values, characterized by, switching means having a plurality of inputs for accommodating acceleration, deceleration and slip control signals for causing a reduction in the value of threshold slip of a slip threshold switching circuit during a time when the acceleration control signal ceases after the slip control signal ceases, and said switching means includes a time delay element having its input coupled to the acceleration control signal, the output of said time delay element is connected to one input of an AND gate and the acceleration control signal is connected to a negated input of said AND gate, and the output of said AND gate is conveyed to a threshold value stage.

13. A switching circuit arrangement for controlling the brake pressure exhausting phase and brake pressure holding phase for antiskid vehicle braking apparatus when the measured velocity change differs from a given velocity change during controlled braking wherein the velocity change is obtained by measuring and forming different velocity values, characterized by, switching means having a plurality of inputs for accommodating acceleration, deceleration and slip control signals for causing an increase in the switching time of the slip control signal when the slip control signal is still present when the acceleration control signal ceases, and said switching means includes a data flip-flop having its data input supplied by a slip control signal and having its clock input supplied with an acceleration control signal, said flip-flop is clocked when an acceleration control signal drops away and a deceleration control signal is applied to the reset input of said flip-flop, and the output of said flip-flop is connected to the clock input of a monostable multivibrator, which provides an output to energize an intake valve and an exhaust valve.

14. A switching circuit arrangement for controlling the brake pressure exhausting phase and brake pressure holding phase for antiskid vehicle braking apparatus when the measured velocity change differs from a given velocity change during controlled braking wherein the velocity change is obtained by measuring and forming different velocity values characterized by, switching means having a plurality of inputs for accommodating acceleration and deceleration control signals for causing an increase in switching time of the acceleration control signal when the acceleration control signal reappears without prior appearance of a deceleration control signal, and said switching means includes a first data flip-flop and a second data flip-flop, the clock inputs of said first and second data flip-flops are supplied with an acceleration control signal, the reset inputs of the first and second data flip-flops are supplied with a deceleration control signal, the data input of said first flip-flop is connected to a positive potential, the output of the first flip-flop is connected to the data input of said second flip-flop, the acceleration control signal is connected to a time delay element, the output of said second flip-flop and the output of said time delay element are connected to an AND gate, and the output signal of the AND gate and the acceleration control signal are connected to inputs of an OR gate, the output of said OR gate is rendered an effective acceleration control signal.

15. A switching circuit arrangement for controlling the brake pressure exhausting phase and brake pressure holding phase for antiskid vehicle braking apparatus when the measured velocity change differs from a given velocity change during controlled braking wherein the velocity change is obtained by measuring and forming different velocity values characterized by, switching means having a plurality of inputs for accommodating acceleration and deceleration control signals for causing an increase in the switching time of the acceleration control signal when a low coefficient of friction has been detected, said switching means includes a data flip-flop having its clock input fed with an acceleration control signal, said flip-flop having its reset input fed with a deceleration control signal and having its data input connected to a positive potential, the output of said flip-flop and the acceleration control signal are connected to an AND gate, the output of said AND gate is connected by a time delay element, the output signal of the time delay element and the acceleration control signal are connected to the inputs of an OR gate (92) so that the output signal of the OR gate is rendered an effective acceleration control signal.

* * * * *